(12) United States Patent
Danis et al.

(10) Patent No.: US 11,965,433 B2
(45) Date of Patent: Apr. 23, 2024

(54) CMC GUIDE VANE FOR A TURBOMACHINE TURBINE

(71) Applicants: SAFRAN AIRCRAFT ENGINES, Paris (FR); SAFRAN CERAMICS, Le Haillan (FR)

(72) Inventors: Antoine Claude Michel Etienne Danis, Moissy-Cramayel (FR); Clément Jarrossay, Moissy-Cramayel (FR); Lucien Henri Jacques Quennehen, Moissy-Cramayel (FR); Nicolas Paul Tableau, Moissy-Cramayel (FR); Matthieu Arnaud Gimat, Moissy-Cramayel (FR)

(73) Assignees: SAFRAN AIRCRAFT ENGINES, Paris (FR); SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 17/997,628

(22) PCT Filed: Apr. 28, 2021

(86) PCT No.: PCT/FR2021/050733
§ 371 (c)(1),
(2) Date: Oct. 31, 2022

(87) PCT Pub. No.: WO2021/224565
PCT Pub. Date: Nov. 11, 2021

(65) Prior Publication Data
US 2023/0212952 A1   Jul. 6, 2023

(30) Foreign Application Priority Data

May 6, 2020 (FR) ...................................... 2004494

(51) Int. Cl.
*F01D 9/06* (2006.01)
*F01D 5/28* (2006.01)
*F01D 25/12* (2006.01)

(52) U.S. Cl.
CPC ............... *F01D 9/06* (2013.01); *F01D 5/284* (2013.01); *F01D 25/12* (2013.01);
(Continued)

(58) Field of Classification Search
CPC . F01D 9/06; F01D 9/065; F01D 5/282; F01D 25/12; F05D 2240/128
See application file for complete search history.

(56) References Cited

U.S. PATENT DOCUMENTS 9,915,159 B2 *   3/2018  Huizenga ................ F01D 25/16
10,605,103 B2 *  3/2020  Vetters .................. F01D 25/005
(Continued)

FOREIGN PATENT DOCUMENTS

EP   3 121 384 A1   1/2017
FR   3 080 146 A1   10/2019

OTHER PUBLICATIONS

International Search Report dated Jul. 14, 2021, PCT/FR2021/050733, filed on Apr. 28, 2021, 2 pages

*Primary Examiner* — Long T Tran
(74) *Attorney, Agent, or Firm* — Oblon, McClelland, Maier & Neustadt, L.L.P.

(57) ABSTRACT

A turbomachine turbine nozzle extending around a central axis, including at least one radially outer shroud, at least one radially inner shroud, and at least one blade made of ceramic matrix composite material, distinct from the radially inner shroud and from the radially outer shroud, and extending radially between the radially inner shroud and the radially outer shroud, the blade being hollow and including a cavity opening at a radially inner end and at a radially outer end of
(Continued)

the blade, the nozzle including at least one tubular mast arranged in the cavity of the blade and allowing routing the ventilation air passing through the cavity of the blade, the mast including a radially outer end attached to the radially outer shroud, and a radially inner end cooperating with a radial flange for positioning the radially inner shroud.

12 Claims, 7 Drawing Sheets

(52) U.S. Cl.
CPC .... *F05D 2220/32* (2013.01); *F05D 2220/323* (2013.01); *F05D 2240/128* (2013.01); *F05D 2260/202* (2013.01); *F05D 2300/20* (2013.01)

(56) References Cited

U.S. PATENT DOCUMENTS

| | | |
|---|---|---|
| 2016/0123164 A1 | 5/2016 | Freeman et al. |
| 2017/0022828 A1 | 1/2017 | Heitman et al. |
| 2017/0138208 A1* | 5/2017 | Hillier .................. C04B 35/111 |
| 2019/0040742 A1* | 2/2019 | Roberts .................. F01D 5/005 |
| 2019/0338660 A1* | 11/2019 | Underwood ........... F01D 9/041 |
| 2019/0390558 A1 | 12/2019 | Sippel et al. |
| 2020/0248568 A1* | 8/2020 | Whittle .................. F01D 5/189 |
| 2020/0291822 A1* | 9/2020 | Sultana .................. F01D 25/28 |
| 2021/0032995 A1* | 2/2021 | Razzell ................ C04B 35/573 |
| 2021/0108525 A1* | 4/2021 | Jarrossay ................ F01D 5/284 |
| 2021/0172330 A1* | 6/2021 | Quennehen ........... F01D 25/246 |
| 2022/0228498 A1* | 7/2022 | Gaillard .................. F01D 9/042 |
| 2022/0364475 A1* | 11/2022 | Tableau .................. F01D 9/042 |

* cited by examiner

CMC GUIDE VANE FOR A TURBOMACHINE TURBINE

TECHNICAL FIELD

The invention relates to the field of turbomachines, particularly aeronautical turbomachines or industrial turbine, and more particularly a turbine nozzle stage made of ceramic matrix composite material, hereafter designated CMC material. The field of application of the invention is in particular that of aeronautical gas turbine engines. The invention is applicable, however, to other turbomachines, turbines for example.

PRIOR ART

High pressure or low pressure nozzles of turbomachines, as described in document FR 2 955 145, include in particular fixed blades each having an airfoil held at each of its ends by an inner platform and an outer platform, the latter defining a circulation stream of gases ejected by the combustion chamber. These blades allow direction the flow of gases leaving the combustion chamber onto the rotor blades of the turbine. These blades are hollow, and include at least one cavity, the ends of which open outside the stream.

The blades being exposed to the hot combustion gases, it is necessary to cool them attenuate the thermal stresses. One solution consists of using the air originating in another element of the turbomachine, for example the compressor. More precisely, the relative cool ventilation air is extracted upstream of the combustion chamber at the outlet of a stage of the compressor. This air is injected into the cavity(ies) of the blade by one or the other of their ends, to cool them from the inside. The air must then escape into the stream by holes made in the blade and communicating with the cavity(ies) of the blade and with the stream, the cooling air creating a protective film of cooler air flowing along the outer surface of the blade.

To do this, a mast, or sleeve, is generally set into the cavity(ies) of a blade of this type. This mast, also hollow, can include a plurality of holes over its entire surface. The relatively cool extracted upstream of the combustion chamber is injected inside the mast to cool the blade, from the inside, by impact.

Moreover, to cool the internal parts of the turbine, a portion of the ventilation air is generally routed via the cavity of at least a portion of the turbine blades to a sub-nozzle cavity, i.e. a cavity arranged radially inside the nozzle, in which in particular the hubs of the rotor disks extend.

However, the improvement of the performance of turbomachines and the reduction of their polluting emissions leads to contemplate higher and higher operating temperatures. For elements of the hot portions of turbomachine, it has therefore been proposed to use ceramic matrix composite materials, denoted CMC hereafter.

CMC materials are typically formed from a fibrous reinforcement of refractory fibers, such as carbon or ceramic fibers, densified by a ceramic or at least partly ceramic matrix.

These materials have advantageous thermo-structural properties, i.e. the mechanical properties make them able to constitute structure elements and the capacity to retain these properties at high temperatures. In addition, CMC materials have a much smaller density that that of metallic materials traditionally used for elements of the hot portions of turbomachines.

Thus the use of CMC materials for turbine nozzle blades has been proposed in documents FR 2 979 662 and FR 3 061 928 for example.

Introducing a nozzle stage, for example a high-pressure nozzle stage comprising CMC blades, thus allows increasing the maximum temperature tolerated compared with a metallic nozzle stage, and thus reducing the quantity of cooling air used. This thus allows increasing the performance if the turbomachine.

However, CMC, due to its properties different from metal, is more sensitive to certain mechanical stresses. In fact CMC has a greater stiffness and a smaller dilation. It behaves better in compression, but its allowable stresses in tension are smaller than those of metal. Moreover, integration in a metallic environment of a CMC part is awkward due to differential thermal dilations between CMC and metal. This is all the more awkward in a turbomachine, and more particularly in a high-pressure portion of the turbomachine, because the environment is very hot, which amplifies the differences the dilation coefficient between the material, the aerodynamic forces undergone by a high-pressure nozzle stage also being high in this zone of the turbine. The difficulty of retaining a deterministic position of the nozzle blades impairs the sealing of the assembly. In fact, the differential dilation of the different materials of these parts causes clearances between these parts during the operation of the turbomachine, and thus produces a sealing defect.

It is therefore necessary to adapt the architecture of these nozzles so that the stresses on the CMC blades are limited, which still retaining their positioning so as to limit differential clearances and thus limiting their leaks.

DISCLOSURE OF THE INVENTION

The present disclosure relates to a turbomachine turbine nozzle extending around a central axis, comprising at least one radially outer shroud, at least one radially inner shroud, and at least one blade made of ceramic matrix composite material, distinct from the radially inner shroud and from the radially outer shroud, and extending radially between said radially inner shroud and radially outer shroud, the blade being hollow and comprising a cavity opening at a radially inner end and at a radially outer end of the blade, the nozzle comprising at least one tubular mast arranged in the cavity of the blade and allowing routing the ventilation air passing through said cavity of the blade, the mast comprising a radially outer end attached to the radially outer shroud, and a radially inner end cooperating with a radial flange for positioning the radially inner shroud, the radially inner end of the mast comprising an engagement portion which cooperates by interlocking with a notch of said radial positioning flange, so as to limit relative movement of the mast with respect to the radial positioning flange.

In some embodiments, the radially outer and inner shrouds and the mast, are made of metal.

Preferably, the nozzle comprises a plurality of blades attached to one another circumferentially around the central axis. Each blade of the nozzle preferably comprises a radially outer platform connected to the radially outer shroud, a radially inner platform connected to the radially inner shroud, and a blade extending radially between these two platforms. The radially inner platform, the radially outer platform and the blade are of CMC.

What is meant by "radially inner or outer ends" is the ends of the blade and of the mast when the blade is mounted in a turbomachine. The blade is hollow, so that its cavity extends on either side of the blade, at each end of it. In other words, a cavity of the blade is equivalent to an opening passing through the entire height of the blade and opening at the radially inner and outer ends of the blade.

Preferably, each blade of the nozzle comprises a mast arranged in the cavity of the blade. The radially outer end of the mast is attached to the radially outer shroud, and the radially inner end of the mast cooperates with the radially inner shroud. More precisely, the radially inner end of the mast cooperates with a radial flange for positioning said radially inner shroud, for example by being in abutment against said flange, by means of the engagement portion and the notch of the flange.

The mast is thus structurally connected to the radially outer shroud, itself integral with the casing of the turbine, and to the inner shroud. The mast is thus not structurally and directly connected to the blade, which is distinct from the inner shroud and from the outer shroud. This configuration allows forces to transit via the mast, avoiding the CMC blade. Each annular sector of the nozzle stage is thus held deterministically, i.e. so as to avoid the annular sector vibrating and controlling its position, this while still allowing the blade to deform under the effects of temperature and pressure independently from the metallic parts.

The device of the present disclosure thus allows improving the sealing of the nozzle, despite the differential thermal dilation of the CMC blades and of the metallic parts.

In addition, the fact that the radially inner end of the mast comprises an engagement portion cooperating by interlocking in a notch of a radial flange for positioning the radially inner shroud allow further improving the positioning of the mast of the nozzle in the circumferential and radial directions. In other words, this allows accurate centering of the radially inner shroud, allowing accurate positioning of this part, while limiting radial and circumferential relative movement of the mast with respect to the radially inner shroud. In particular, this coupling between the mast and the inner shroud, by means of the engagement portion and the notch, allows limiting, or even blocking a rotation movement of the mast with respect to the radially inner shroud, around the central axis.

Thus, the nozzle according to the present disclosure allows limiting differential dilations, while improving the positioning of the parts.

In some embodiments, the engagement portion is arranged at a downstream end, along the central axis, of the radially inner end of the mast.

In other words, the mast has a leading edge and a trailing edge, the engagement portion being arranged at the trailing edge. Thus, only one portion of the mast is used to cooperate with the notch of the positioning flange. This allows facilitating the manufacture of the nozzle.

In some embodiments, the engagement portion comprises a shoulder provided in the thickness of the mast.

The shoulder can be a cutaway cut into the material constituting the mast. Thus the thickness of the mast is locally smaller at the shoulder that in the rest of the mast. In particular, preferably, the engagement portion of the mast can, at the shoulder, have a shape complementary to that of the notch, facilitating interlocking an improving the retention of the engagement portion in the notch. Thus this configuration allows, when the shoulder is engaged in the notch, improving the positioning of the mast with respect to the radially inner shroud, along the circumferential and radial directions.

In some embodiments an internal passage of the tubular mast opens facing an opening of said radially inner shroud, so as to route ventilation air through the opening to a sub-nozzle cavity arranged radially inside the radially inner shroud.

The internal passage of the tubular mast opens radially between the radially inner end of the blade and the radially inner shroud, facing the opening of the radially inner shroud. It is therefore understood that the length of the mast, in the radial direction, is greater than that of the blade, the inner end of the mast continuing radially inward beyond the inner end of the blade. What is meant by "facing" is that the internal passage of the mast opens at a circumferential position substantially identical to that of the opening. In other words, the internal passage of the mast is substantially in the continuation of the opening. This arrangement thus allows conveying the ventilation air as close as possible to the opening, to the sub-nozzle cavity through said opening, so as to pressurize this cavity.

In some embodiments, the nozzle comprises a sealing box arranged radially between the radially inner platform of the blade and the radially inner shroud, the sealing box comprising an internal housing opening facing the orifice of the radially inner shroud, the radially inner end of the mast being arranged at least partly in the sealing box so as to eject the ventilation air passing through the mast into said sealing box.

The sealing box is preferably metallic. The radially inner end of the mast is arranged at least partly in the sealing box so that the internal passage of the mast opens into the box. The presence of the sealing box allows limiting the leaks during the passage of the ventilation air between the radially inner end of the mast and the opening of the radially inner shroud, intended to be injected into the sub-nozzle cavity to pressurize the latter. More precisely, the presence of the sealing box allows confining the ventilation air in the space between the radially inner shroud and the radially inner platform, in particular in the internal housing of the sealing box.

In some embodiments, the radially inner platform of the blade is connected to the sealing box by means of sealing tabs allowing radial relative translation of the sealing box with respect to the blade.

The tabs are preferably connected to the radially inner platform on the one hand, and to the sealing box on the other hand, by being inserted into grooves of said platform and of said shroud respectively. The clearance, or radial movement of the sealing box, is limited on the one hand, by the radially inner platform of the blade, and on the other hand by the radially inner shroud. The fact that the sealing box is not attached to the radially inner platform of the CMC blade, involving a small radial clearance between the box and the blade, allows further limiting of the stresses passing through this blade. In addition, despite this freedom of movement, the tabs allow providing sealing between the sealing box and the blade, thus limiting leaks of ventilation air passing between the radially inner end of the mast and the sub-nozzle cavity, via the opening of the radially inner shroud.

In some embodiments, the nozzle comprises at least one annular connecting member comprising a radially outer connecting end connected to the sealing box, and a radially inner connecting end connected to the opening of the radially inner shroud, so as to be able to route toward the sub-nozzle cavity the ventilation air passing through the mast and the sealing box.

Preferably, the radially outer connecting end is connected in a sealed manner to the sealing box, and the radially inner sealing end is attached in a sealed manner to the opening of the radially inner shroud. Moreover, the sealing box and connecting member assembly can also translate radially with respect to the blade. The presence of the connecting member allows having the ventilation air present in the sealing box transit to the sub-nozzle cavity, while further limiting the leaks of ventilation air out of this passage, and further improving the sealing between these different parts.

In some embodiments, the radially inner and outer connecting ends of the connecting member have a domed shape.

The domed shape allows a certain relative mobility of the radially inner shroud and of the sealing box, while still allowing satisfactory sealing between these different parts.

In some embodiments, the radially inner shroud comprises an upstream radial flange and a downstream radial flange configured to axially surround the sealing box, the radial positioning flange being arranged axially between the upstream flange and the downstream flange.

The presence of the upstream and downstream flanges allows limiting the axial displacements, i.e. along the central axis, of the sealing box.

In some embodiments, the nozzle comprises an intermediate connecting part attached to the sealing box on a radially inner face of said box, the intermediate connecting part comprising a tubular portion communicating with the internal housing of the box, the radially outer connecting end of the connecting member being connected to the tubular portion of the intermediate connecting part. Alternatively, the sealing box and the intermediate connecting part form a single identical part. In other words, the box itself comprises the tubular portion.

The present disclosure also relates to a turbine comprising a nozzle according to any one of the preceding embodiments.

The present disclosure also relates to a turbomachine comprising a turbine according to the present disclosure.

BRIEF DESCRIPTION OF THE DRAWINGS

The invention and its advantages will be better understood upon reading the detailed description given hereafter of different embodiments of the invention, given by way of non-limiting examples. This description refers to the pages of appended figures, in which.

DESCRIPTION OF THE EMBODIMENTS

Figure 1:
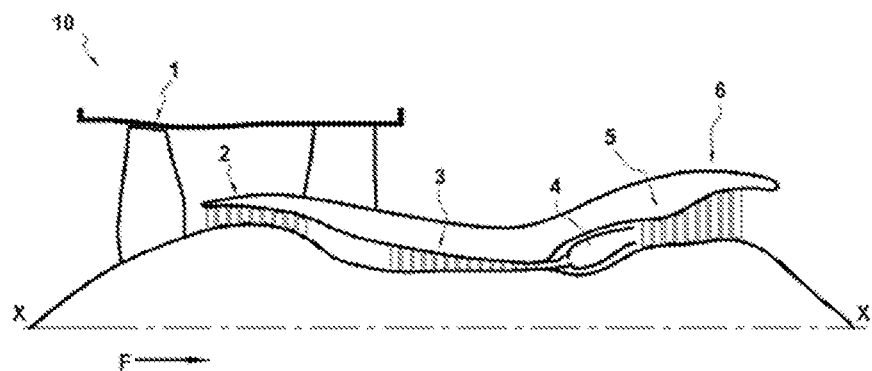
FIG. 1 shows a longitudinal section view of a turbomachine according to the present disclosure.

The terms "upstream" and "downstream" are defined hereafter with respect to the direction of flow of the gases through a turbomachine, indicated by the arrow F in FIG. 1.

The term "radial" and its derivatives is considered with respect to the central axis X of the turbomachine. More precisely, a radial direction is a direction perpendicular to the central axis X.

FIG. 1 illustrates a double flow turbomachine 10 extending around a central axis X, and comprising in known fashion, from upstream to downstream successively, at least one fan 1, an engine portion comprising successively at least one low-pressure compressor 2 stage, one high-pressure compressor 3 stage, a combustion chamber 4, at least one high-pressure turbine 5 stage, and one low-pressure turbine 6 stage.

In known fashion, a fraction of air is extracted from the high-pressure compressor 3, for example, and is conveyed by means of a cooling line (not shown) for the purpose of cooling the hotter zones of the turbomachine 10, particularly the high-pressure turbine 5 and the low-pressure turbine 6. In particular, this fraction of air, or ventilation air, can be injected into the hollow blades of the high-pressure or low pressure turbine 5, 6 so as to cool the latter, and be conveyed to a cavity P arranged radially below the nozzles of these turbines, so as to pressurize this cavity P and thus limit the leaks of hot air flowing in the stream, and also cool certain internal parts of the turbine, for example the rotor disks.

In a manner that is also known, a turbine such as the high-pressure turbine 5 or the low-pressure turbine 6 includes one or more stages, each stage comprising a nozzle, also called a straightener, and a movable wheel. Each nozzle comprises fixed blades distributed circumferentially around the central axis X.

A nozzle sector according to one embodiment of the invention will be described with reference to FIGS. 2 to 7B.

Figure 2:
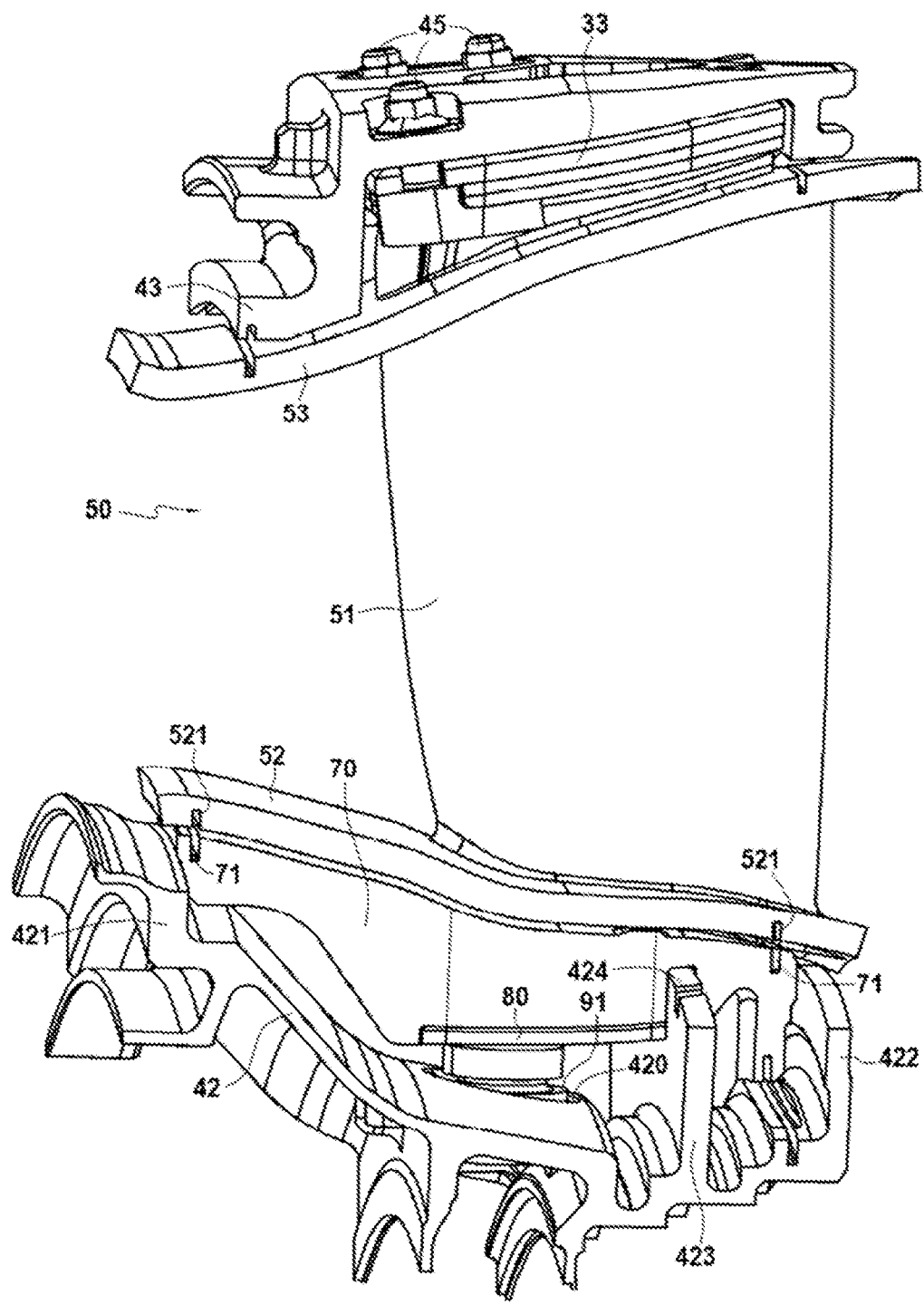
FIG. 2 shows a perspective view of a nozzle according to the present disclosure.

FIG. 2 shows a perspective view of a blade 50 of a nozzle of the high-pressure turbine 5. This example is not limiting, and can be applied to other portions of the turbomachine, particularly the low-pressure turbine 60.

Each blade 50 is hollow and comprises an airfoil 51, extending radially between a radially inner platform 52 (hereafter, "inner platform 52") and a radially outer platform 53 (hereafter, "outer platform 53").

When the blades 50 of the nozzle are assembled together circumferentially, the platforms 52, 53 define a circulation stream of the gases ejected by the combustion chamber 4. The airfoil 51, the inner 52 and outer 53 platforms, are made of ceramic matrix composite ("CMC") material.

In addition, the blade 50 extends radially between a radially inner shroud 42 (hereafter, "inner shroud 42"), and a radially outer shroud 43 (hereafter, "outer shroud 43"), these inner 42 and outer 43 shrouds being metallic, based for example on nickel or cobalt. The outer shroud 43 is integral with a fixed casing (not shown) of the high-pressure turbine 50. The outer platform 53 is connected to the outer shroud 43 and the inner platform 52 is connected to the inner shroud 42 by means of a sealing box 70.

The sealing box 70 is arranged radially between the inner platform 52 and the inner shroud 42. It comprises several walls assembled together hermetically, forming an inner housing I. The sealing box 70 comprises, at its upstream and downstream ends, a groove 71, arranged facing grooves 521 of the inner platform 52 of the blade 50. The sealing box 70 is connected to the inner platform 52, at its upstream and downstream ends, by means of sealing tabs 72, inserted into the grooves 71 and 521, respectively of said box and of said platform. The sealing tabs 72 allow ensuring the axial sealing of the connection between the box 70 and the inner platform 52, while still allowing radial translation of the box 70, the radial movement of the latter being however limited by the inner platform 52 on the one hand, and the inner shroud 42 on the other hand.

Although not shown, the outer platform 53 of the blade 50 can also be connected to the outer shroud 43 by means of sealing tabs, according to the same principle as that described in the preceding paragraph, allowing sealing between these two parts, while preventing forces from transiting between them.

Moreover, the sealing box 70 is axially surrounded between an upstream flange 421 and a downstream flange 422 of the inner shroud 42, these flanges thus limiting the axial movements of the sealing box 70. The sealing box 70 can also include a notch engaged with a radial positioning flange 423 of the inner shroud 42, allowing determining the axial positioning of said of said box. The radial positioning flange 423 is arranged axially between the upstream flange 421 and of the downstream flange 422 of the inner shroud 42.

An intermediate connecting part 80 is attached to the sealing box 70. In this example, the intermediate part 80 is welded on a lower, or radially inner, side of the box 70, thus forming the lower wall of said box 70. The intermediate part 80 comprises a tubular portion 81, one end of which communicates with the inner housing I of the box 70. The other end of the tubular portion opens on an opening 420 of the inner shroud 42. In particular, each inner shroud 52 of the nozzle comprises an opening 420. In other words, a nozzle, formed by the circumferential assembly of the platforms of the blade and of the inner and outer shrouds, comprises a plurality of openings 420 distributed circumferentially around the central axis X, an opening 420 being provided for each blade 5 of the nozzle, at the same circumferential position as this blade 5.

Alternatively, the intermediate connecting part 80 and the box 70 may form only a single identical part. In this case, the tubular portion 81 extends from the lower wall of the box 70, facing the opening 420.

A connecting member 90, with a substantially annular shape so as to define a substantially cylindrical opening 94, is arranged in the opening 420. The connecting member 90 comprises a radially outer connecting end 93, a radially inner end 92 and a central portion 91 having the shape of a collar, arranged between the connecting ends 92 and 93. The central portion 91 can in particular serve as an abutment against the wall delimiting the opening 420, thus limiting the amplitude of the translation movements of the connecting member and of the box 70.

Figure 3:
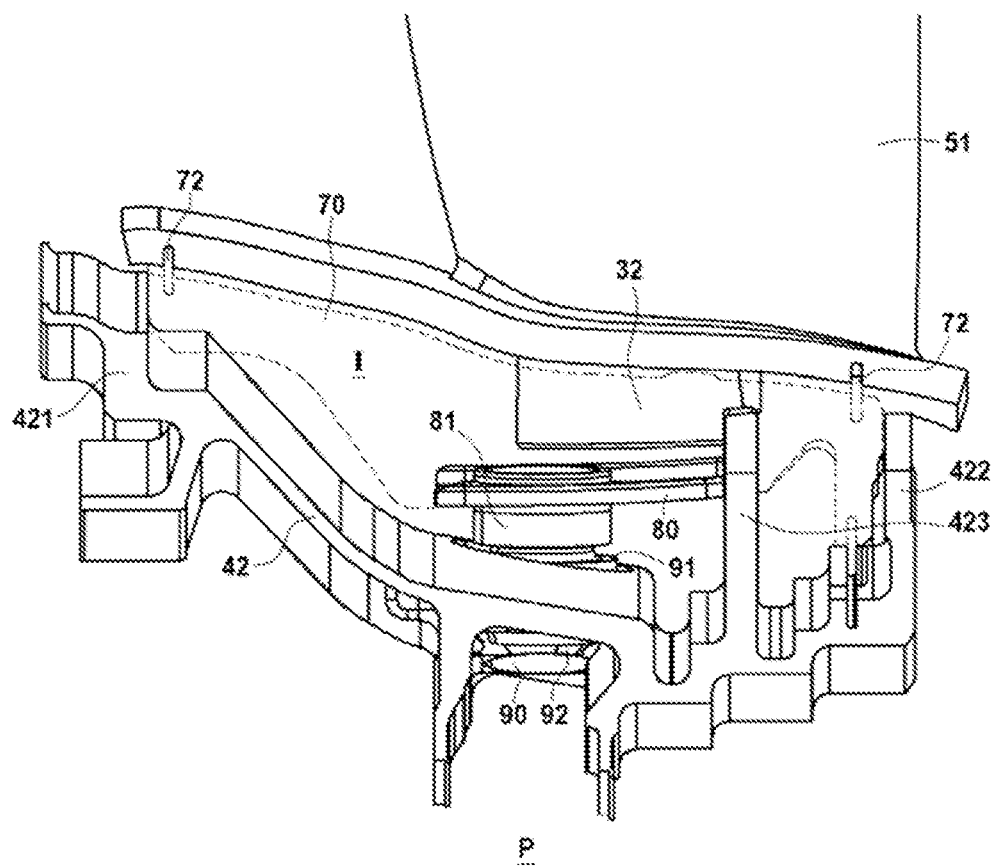
FIG. 3 shows the lower portion of the nozzle of FIG. 2, the sealing box being illustrated in transparency.
Figure 4:
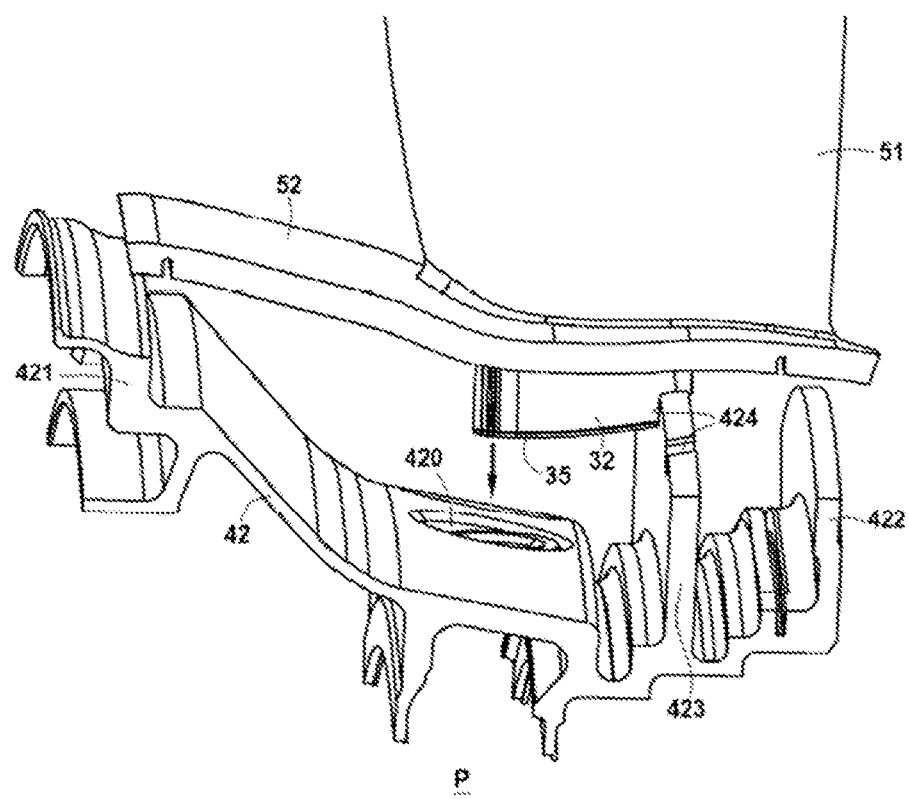
FIG. 4 shows the lower portion of the nozzle of FIG. 2, the sealing box and the intermediate connecting part being hidden.
Figure 5:
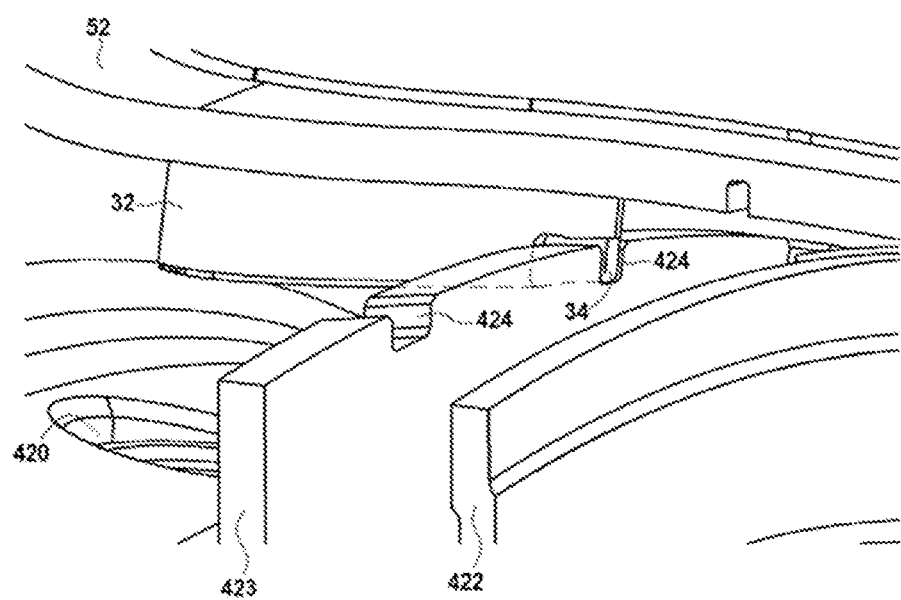
FIG. 5 shows a detailed perspective view of the connection between the jacket and the inner shroud of the nozzle of FIG. 4.
Figure 6A:
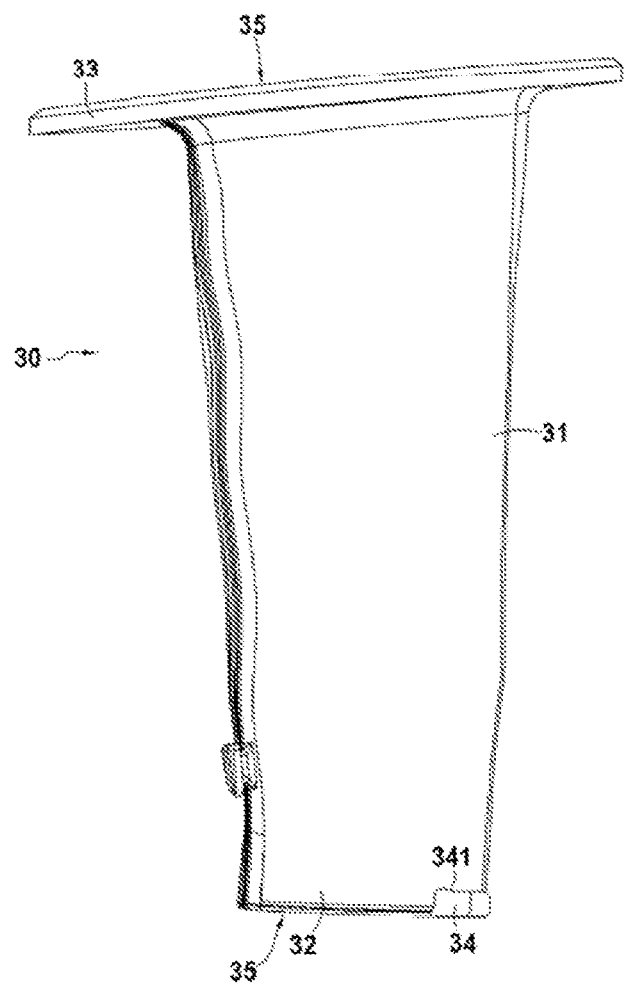
FIG. 6A shows a perspective view of a nozzle jacket according to the present disclosure.
Figure 6B:
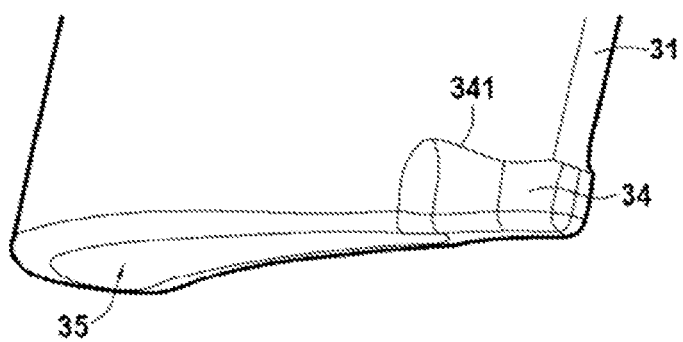
FIG. 6B shows a detailed view of the inner end of the jacket of FIG. 6A.
Figure 7A:
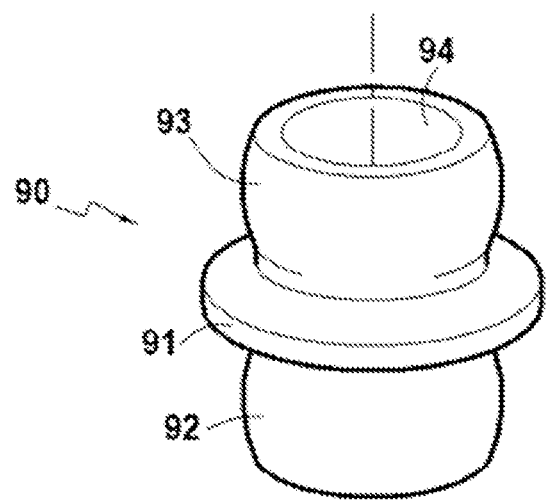
FIG. 7A shows a perspective view of a connecting member of the nozzle according to the present disclosure.
Figure 7B:
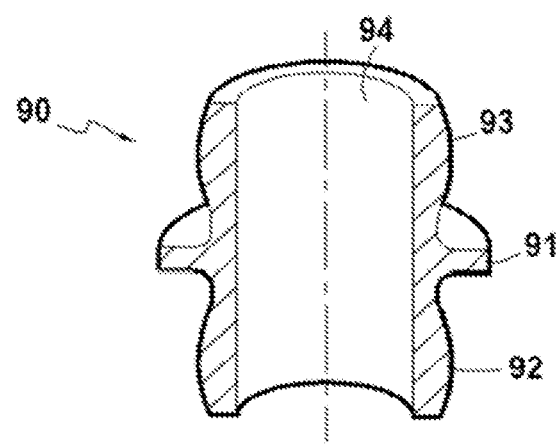
FIG. 7B shows a longitudinal section view of the connecting member of FIG. 7A.

The radially outer connecting end 93 is connected to the sealing box 70, by means of the tubular portion 81 of the intermediate part 80, and the radially inner connecting end 92 connected to the inner shroud 42. More precisely, in this example, the inner 92 and outer 93 connecting ends have a domed shape. Thus, the radially outer connecting end 93 is attached to the tubular portion 81, for example by being force-fitted into it. In FIGS. 2 and 3, the radially outer connecting end 93 is inserted into the tubular portion 81, and is therefore not visible. The radially inner connecting end 92 is attached to the inner shroud 42 by being force-fitted into the opening 420. This connecting member 90 thus allows placing the sub-nozzle cavity P and the inner housing I of the sealing box 70 into fluid communication.

A metallic mast 30, base for example on nickel and/or on cobalt, is inserted into the cavity of each blade 50. The mast 30 comprises a hollow tubular portion 31 arranged in the cavity of the blade 50. Thus the ventilation air injected into the cavity of the blade 50 can flow in the mast 30, via an internal passage 35 extending inward from the hollow tubular portion 31, between its two radial ends. The tubular portion 31 of the mast 30 has a shape that flares substantially in the radial direction, with a smaller cross section at the inner end 32 than at the outer end 33.

The radially outer end 33 of the mast 30 comprises a collar fixed to the outer shroud 43, by bolted connections 45 for example. A radially inner end 32 of the mast 30 is arranged facing an opening 420 of the inner shroud 42. What is meant by "facing" is that the inner end 32 of the mast 30, more precisely the end of the internal passage 35 present in the tubular portion 31, is arranged so that the ventilation air circulating in the tubular portion 31 can be injected toward the opening 420 (symbolized by the arrow in FIG. 4), the latter communicating with the cavity P, arranged radially inside the inner shroud 42.

The inner end 32 of the mast 30 is arranged in the inner housing I of the sealing box 70, facing the end of the tubular portion 81 of the intermediate part 80 opening into said housing. Thus, the ventilation air circulating in the tubular portion 31 is ejected through the inner end 32 of the mast into the housing of the box 70, then conveyed to the sub-nozzle cavity P by means of the tubular portion 81 and of the connecting member 90. It will therefore be noted that the inner end 32 is facing at the same time the opening 420, the connecting member 90, and the tubular portion 81, the three latter elements being concentric with one another.

The ventilation air flowing in the tubular portion 31 can thus be guided to the sub-nozzle cavity P in order to pressurize the latter, by means of the sealing box 70, the tubular portion 81 and the connecting member 90. These elements allow conveying the ventilation air, while limiting the leaks of the latter during this conveying. In particular, the sealing box 70 allows confining the ventilation air ejected by the inner end 32 of the mast 30, while preventing this air from escaping in the axial and circumferential directions.

In addition, the inner end 32 of the mast 30 also comprises an engagement portion 34 which can engage in a notch 424 of the radial positioning flange 423 of the inner shroud 42. More precisely, the radial positioning flange 423 comprises a plurality of notches 424 distributed circumferentially around the central axis X. Preferably, the radial positioning flange 423 comprises as many notches 424 as blades 50, and therefore as masts 30. The engagement portion 34 is arranged at the downstream end of the radially inner end 32 of the mast 30.

In this example, the engagement portion 34 is a locally thinned portion of the mast 30. More precisely, the engagement portion 34 is a local cutaway accomplished, for example, by removing material in the thickness of the mast 30. A cutaway of this type is characterized by a sudden change in the profile of the surface of the mast 30. The thickness of this engagement portion 34 is such that the latter can engage in the notch 424 of the radial positioning flange 423. Conversely, in the portions of the mast 30 other than this engagement portion 34, the thickness of the mast is too great to be able to engage in this notch 424. Thus, when the engagement portion 34 is engaged in the notch 424, a wall 341 of the mast 30, corresponding to the cutaway line allowing forming the engagement portion 34, comes into abutment against the walls of this notch 424.

Thus, during the assembly of the mast 30 into the blade 50, the engagement portion 34 as well as the notch 424 of the radial positioning flange 423 of the inner shroud 42 allows facilitating the radial and circumferential positioning of the mast 30, allowing its accurate positioning. In particular, this allows positioning the inner end 32 of the mast 30 inside the sealing box 70, without this end coming into abutment, outside of the engagement portion 34, against other parts. Moreover, the outer end 33 of the mast 30 is connected to the outer shroud 43 by being attached to it, and the inner end 32 is connected to the inner shroud 42 by engagement of the engagement portion 34 into the notch 424. Thus, the forces can transit through the metal parts, particularly the outer shroud 43, the mast 30 then the inner shroud 42, while avoiding stressing the blade 50 made of CMC.

Moreover, in order to improve the effectiveness of coupling between the mast 30 and the inner shroud 42, the engagement portion 34 can have a length, in the direction of the central axis X, comprised between 1.5 and 8 mm, preferably comprised between 5 and 8 mm, depending on the bulk and the design of the airfoil and the bulk. In addition, the notch 424 can have a radially flared shape, allowing facilitating the insertion of the engagement portion 34 into it.

Although the present invention has been describe by referring to specific embodiments, it is obvious that modifications and changes can be carried out on these examples without departing from the general scope of the invention as defined by the claims. In particular, individual features of the different embodiments illustrated/mentioned can be combined into additional embodiments. Consequently the description and the drawings should be considered in an illustrative, rather than a restrictive sense.

The invention claimed is:

1. A turbomachine turbine nozzle extending around a central axis, comprising:
   a radially outer shroud,
   a radially inner shroud comprising a radial positioning flange,
   a blade made of ceramic matrix composite material, distinct from the radially inner shroud and from the radially outer shroud, and extending radially between said radially inner shroud and said radially outer shroud, the blade being hollow and comprising a cavity opening at a radially inner end and at a radially outer end of the blade, and
   a tubular mast arranged in the cavity of the blade and allowing routing of ventilation air passing through said cavity of the blade, the tubular mast comprising a radially outer end attached to the radially outer shroud, and a radially inner end cooperating with the radial positioning flange of the radially inner shroud, the radially inner end of the tubular mast comprising an engagement portion which cooperates by interlocking with a notch of said radial positioning flange so as to limit relative movement of the tubular mast with respect to the radial positioning flange.

2. The nozzle according to claim 1, wherein the engagement portion is arranged at a downstream end, along the central axis, of the radially inner end of the tubular mast.

3. The nozzle according to claim 1, wherein the engagement portion comprises a shoulder provided in the thickness of the tubular mast.

4. The nozzle according to claim 1, wherein an internal passage of the tubular mast opens facing an opening of said radially inner shroud, so as to route the ventilation air through the opening to a sub-nozzle cavity arranged radially inside the radially inner shroud.

5. The nozzle according to claim 2, comprising a sealing box arranged radially between a radially inner platform of the blade and the radially inner shroud, the sealing box comprising an internal housing opening facing an orifice of the radially inner shroud, the radially inner end of the tubular mast being arranged at least partly in the sealing box so as to eject the ventilation air passing through the tubular mast into said sealing box.

6. The nozzle according to claim 5, wherein the radially inner platform of the blade is connected to the sealing box with sealing tabs allowing radial relative translation of the sealing box with respect to the blade.

7. The nozzle according to claim 5, wherein the radially inner shroud comprises an upstream radial flange and a downstream radial flange configured to axially surround the sealing box, the radial positioning flange being arranged axially between the upstream radial flange and the downstream radial flange.

8. A turbomachine turbine comprising at least one nozzle according to claim 1.

9. A turbomachine comprising at least one turbine according to claim 8.

10. The nozzle according to claim 1, wherein a length of the engagement portion in a direction along the central axis is between 1.5 mm and 8 nm.

11. The nozzle according to 5, comprising an annular connecting member comprising a radially outer connecting end connected to the sealing box, and a radially inner connecting end connected to the opening of the radially inner shroud, so as to be able to route toward the sub-nozzle cavity the ventilation air passing through the tubular mast and the sealing box.

12. The nozzle according to claim 11, wherein the radially inner and outer connecting ends of the connecting member have a domed shape.

\* \* \* \* \*